United States Patent

Yeandle

[11] Patent Number: 6,075,914
[45] Date of Patent: Jun. 13, 2000

[54] APPARATUS FOR CONNECTING AN OPTICAL FIBER TO AN OPTICAL DEVICE

[75] Inventor: Jonathan Charles Yeandle, Paignton, United Kingdom

[73] Assignee: Bookham Technology Limited, Abindon Oxon, United Kingdom

[21] Appl. No.: 09/057,642

[22] Filed: Apr. 9, 1998

[30] Foreign Application Priority Data

Nov. 21, 1997 [GB] United Kingdom .................. 9724546

[51] Int. Cl.⁷ ...................................... G02B 6/30
[52] U.S. Cl. ............................................................ 385/49
[58] Field of Search .......................... 385/49, 59, 88–90, 385/147, 75, 63, 71; 174/262, 266; 29/830, 845, 834, 843; 264/241

[56] References Cited

U.S. PATENT DOCUMENTS

| | | | |
|---|---|---|---|
| 3,946,931 | 3/1976 | Bahnck et al. | 29/834 |
| 4,728,187 | 3/1988 | Dubroeucq et al. | 356/153 |
| 4,830,456 | 5/1989 | Kakii et al. | 385/75 |
| 4,920,262 | 4/1990 | Aiki et al. | 250/227.11 |
| 5,007,700 | 4/1991 | Albares | 350/96.17 |
| 5,351,329 | 9/1994 | Moore et al. | 385/92 |
| 5,401,911 | 3/1995 | Anderson et al. | 174/262 |
| 5,497,439 | 3/1996 | Piffaretti et al. | 385/98 |
| 5,829,128 | 11/1998 | Eldridge et al. | 29/855 |
| 5,864,946 | 2/1999 | Eldridge et al. | 174/261 |

FOREIGN PATENT DOCUMENTS

| | | |
|---|---|---|
| 139171 | 5/1985 | European Pat. Off. . |
| 256510 | 2/1988 | European Pat. Off. . |
| 427705 | 5/1991 | European Pat. Off. . |
| 031053 | 7/1991 | European Pat. Off. . |
| 701154 | 3/1996 | European Pat. Off. . |
| 1 558605 | 1/1980 | United Kingdom . |
| 2 034069 | 5/1980 | United Kingdom . |
| 2 230647 | 10/1990 | United Kingdom . |

*Primary Examiner*—Akm E. Ullah
*Attorney, Agent, or Firm*—Roberts Abokhair & Mardula, LLC

[57] ABSTRACT

An optical fiber is connected to an optical device having a substrate with locating means, such as a V-groove, for locating the fiber on the substrate. Attachment means secure the optical fiber at a position remote from the locating means so that the fiber is held in a state of elastic deformation to assist in holding the fiber in contact with the locating means without it being secured thereto.

21 Claims, 2 Drawing Sheets

APPARATUS FOR CONNECTING AN OPTICAL FIBER TO AN OPTICAL DEVICE

RELATIONSHIP TO OTHER APPLICATIONS

The present application claims priority under 35 USC 119 from Great Britain application No. GB9724546.8, entitled "APPARATUS FOR CONNECTING AN OPTICAL FIBRE TO AN OPTICAL DEVICE" filed Nov. 21, 1997. The disclosures of the referenced application is hereby incorporated herein by reference.

FIELD OF THE INVENTION

This invention relates to an apparatus for connecting an optical fiber to an optical device.

BACKGROUND OF THE INVENTION

It is known to connect an optical fiber to an optical device by mounting the end of the fiber in a V-groove provided in the face of an optical chip in order to align the optical fiber with a waveguide on the chip. The fiber is conventionally secured in the V-groove by adhesive or solder which can cause misalignment if too much or too little adhesive or solder is used. Such apparatus also suffers from disadvantages arising from solidification of the adhesive or solder or material creep in the adhesive or solder which can both cause movement of the fiber and so disturb the alignment of the fiber with the waveguide.

The present invention seeks to overcome or avoid such problems.

SUMMARY OF THE INVENTION

According to a first aspect of the invention, the apparatus connects an optical fiber to an optical device comprising a substrate having locating means for locating a fiber on the substrate, and attachment means for securing the optical fiber at a position remote from the locating means such that when the fiber is secured to the attachment means the fiber is held in a state of elastic deformation so as to assist in holding the fiber in contact with said locating means without it being secured thereto.

Other features of the invention will be apparent from the following description and from the subsidiary claims of the specification.

The invention will now be further described, merely by way of example, with reference to the accompanying drawings, in which:

BRIEF DESCRIPTION OF THE INVENTION

DETAILED DESCRIPTION OF THE INVENTION

Figure 1:
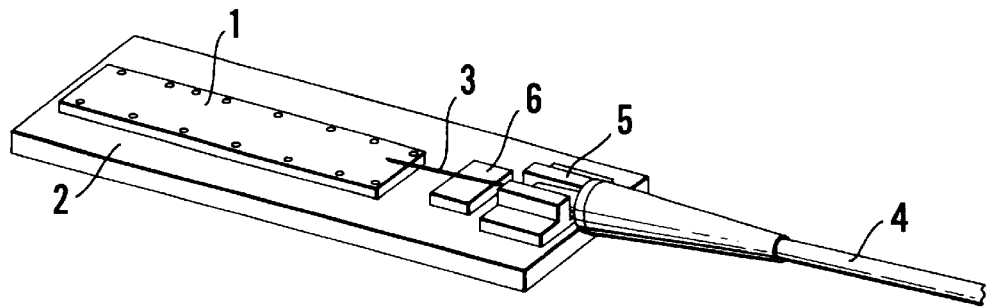
FIG. 1 is a perspective view of the apparatus according to one embodiment of the invention.
Figure 2:
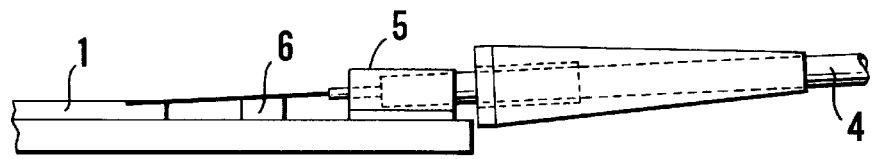
FIG. 2 is a side view of the apparatus shown in FIG. 1.

FIGS. 1 and 2 show a substrate in the form of an optical chip 1 mounted on a base 2, e.g. of aluminum oxide or aluminum nitride, and an optical fiber 3 for transmitting signals received on an optical fiber cable 4 to an optical device on the optical chip 1, or vice versa. A fiber jacket tie-off 5 is provided on the base 2 for securing the fiberjacket tie-off 5 or other external coating of the fiber cable 4 to the base 2, or to a casing attached thereto, so that external forces applied to the cable fiber 4 are not transmitted to the optical chip 1. The fiber jacket tie-off 5 is arranged so that it rigidly holds the external coating of the fiber cable 4. The fiber itself is not, however, rigidly held by the fiber jacket tie-off 5 due to the provision of resilient plastics material around the optical fiber 3 which permits the optical fiber 3 to move to some extent relative to the fiber jacket tie-off 5.

FIGS. 1 and 2 also show a fiber attach pad 6 for securing the optical fiber 3 at a position remote from the optical chip 1.

Figure 3A:
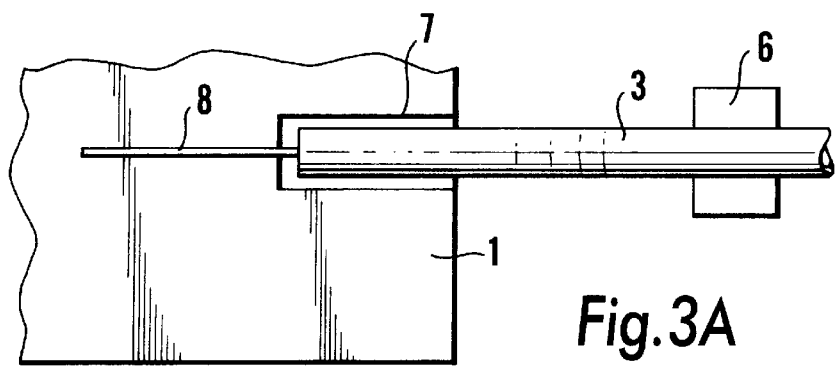
FIGS. 3A and 3B are schematic diagrams showing enlarged plan and side views of the apparatus according to the invention. The curvature of the fiber shown in FIG. 3B has been exaggerated to further illustrate a feature of the invention.
Figure 3B:
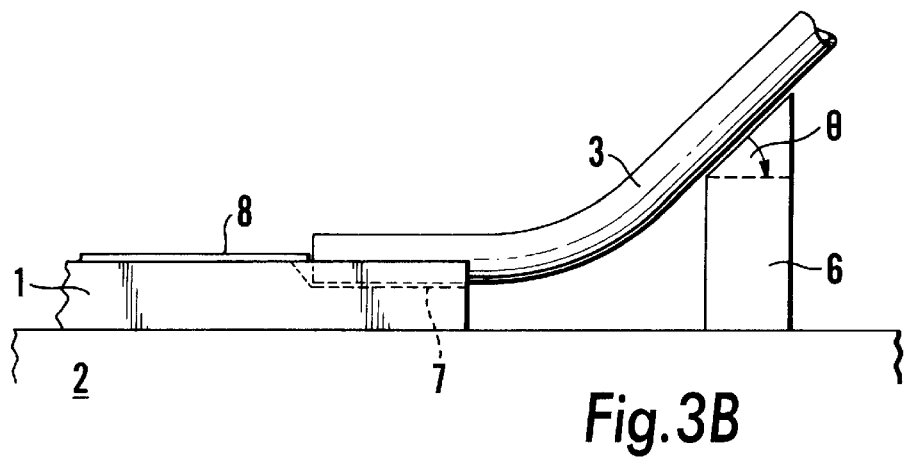

As more clearly shown in FIGS. 3A and 3B, the end of the optical fiber 3 is located in a V-groove 7 provided in the surface of the optical chip 1. FIGS. 3A and 3B also show an optical waveguide 8 on the optical chip 1 with which the optical fiber 3 is to be aligned. The V-groove 7 serves to locate the lateral position of the optical fiber 3, i.e. in a direction perpendicular to the optical axis of the waveguide 8 and the optical fiber 3. In this case the position of the optical fiber 3 is in a direction perpendicular to the plane of the optical chip 1 and the position of the optical fiber 3 in both directions is perpendicular to the said optical axis within the plane of the optical chip 1.

As shown in FIG. 3B, the fiber 3 is secured to the fiber attach pad 6 which is located remote from the V-groove 7 and the optical fiber 3 is held by the fiber attach pad 6 at a position further from the base 2 than the V-groove 7 so that the optical fiber 3 is held in a state of elastic deformation between the fiber attach pad 6 and the V-groove 7. Thus, the optical fiber 3 adopts a curved shape as shown (somewhat exaggerated) in FIG. 3B. This elastic deformation of the optical fiber 3 assists in holding the end of the fiber 3 in the V-groove 7 as the elastic deformation urges the end of the optical fiber 3 in a direction towards the bottom of the V-groove 7 and resists movement of the optical fiber 3 out of the V-groove 7 in a direction perpendicular to the plane of the optical chip 1. The end of the optical fiber 3 is thus held within the V-groove 7 without the need for adhesive or solder in the V-groove 7.

The fiber attach pad 6 is typically located between 2 and 10 mm from the V-groove 7.

The optical fiber 3 is secured to the fiber attach pad 6 by an adhesive, e.g. a light-cured or heat-cured resin, or solder, e.g. a glass solder, or may be secured thereto by mechanical means (not shown), e.g. a clamp. The top surface of the fiber attach pad 6 is preferably inclined to the plane of the optical chip 1 by an angle $\theta 15$ so that the optical fiber 3 is held in an inclined position thereon. The angle $\theta 15$ may typically be in the range of 1 to 5 degrees and preferably in the range of 2.5 to 3.5 degrees. The angle $\theta 15$ selected will depend upon the geometry of the arrangement, i.e. the height of the fiber attach pad 6, distance between the fiber attach pad and the V-groove 7, by the elastic properties of the optical fiber 3 and other related factors. The larger the angle $\theta 15$, the more securely the end of the optical fiber 3 is held in the V-groove 7 but if the angle $\theta 15$ is too large tensile strain induced on the optical fiber 3 may lead to failure of the optical fiber 3 due to static fatigue. Preferably, the angle $\theta 15$ is selected so as to introduce a maximum strain of 0.3–0.4% on the outer curved surface of the optical fiber 3. However, in some cases, depending on the geometry of the arrangement and the strength of the optical fiber 3, the maximum strain due to the curvature of the optical fiber 3 may be as low as 0.1% and in other cases it may be higher, e.g. up to 1% or 2%.

The arrangement should also be designed so that the elastic deformation holds the optical fiber 3 in the V-groove 7 with sufficient force to resist forces due to shock and vibration which could cause the optical fiber 3 to move out of contact with the V-groove 7. This depends on the application. In cases where the apparatus is unlikely to be subject to any extremes of motion, the arrangement may be designed so as to resist movement of the optical fiber 3 out of the V-groove 7 when subject to an acceleration of up to forty (40) times the force of gravity. In other cases, it may be desirable to ensure the optical fiber 3 remains held in the V-groove 7 by the forces caused by its elastic deformation when subject to accelerations of several thousand times the force of gravity.

In addition to avoiding misalignment problems associated with the use of adhesive or solder in the V-groove 7, the apparatus described also helps avoid long term stress corrosion problems with the optical fiber 3 as the optical fiber 3 is only rigidly fixed at one point, i.e. to the fiber attach pad 6. In a conventional arrangement, the optical fiber 3 is secured by adhesive or solder in the V-groove 7 and also rigidly secured at the fiber jacket tie-off 5. The length of optical fiber 3 between these two fixed points is subject to differential thermal expansion with the base 2 which induces stresses and strains in the optical fiber 3 which can lead to the optical fiber 3 failing. In the arrangement described herein, the length of the optical fiber 3 between the fiber attach pad 6 and V-groove 7 is only secured at one end, i.e. to the fiber attach pad 6, so the end of the optical fiber 3 on the optical chip 1 is free to move along the length of the optical fiber 3 as the optical fiber 3 expands and contracts without stresses or strains being induced therein. This helps increase the long term reliability of the apparatus. A similar problem does not arise in the length of fiber between the fiber attach pad 6 and the fiber jacket tie-off 5 as the latter only holds the fiber jacket tie-off 5 and the optical fiber 3 is still able to move due to the resilient nature of the plastics materials between the optical fiber 3 and the fiber jacket tie-off 5.

Figure 4:
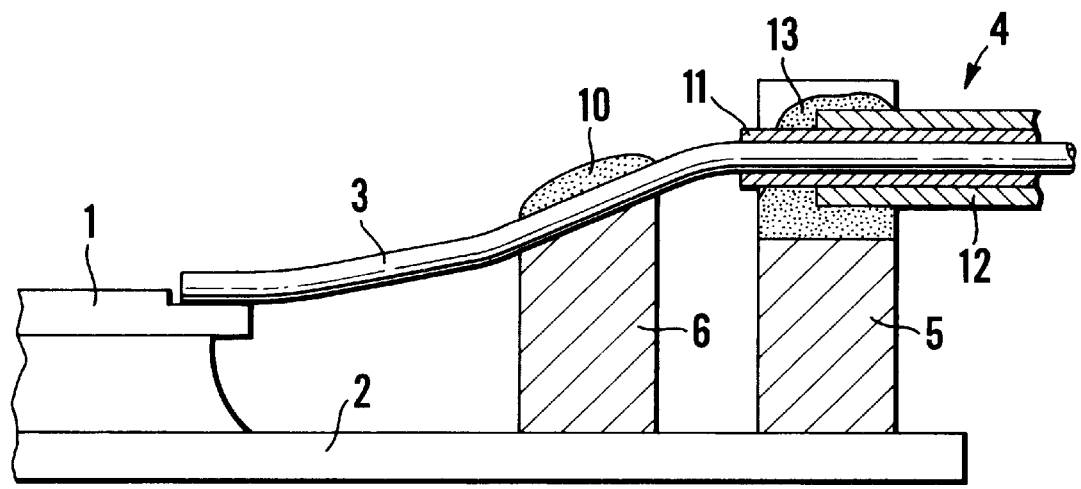
FIG. 4 is a schematic cross-sectional, side view of the apparatus shown in FIGS. 1 and 2.

FIG. 4 is a schematic, cross-sectional view through the apparatus viewed from the side. FIG. 4 shows the fiber cable 4 secured to the fiber jacket tie-off 5 and the optical fiber 3 extending therefrom to an optical device 1. Between the fiber jacket tie-off 5 and the optical device 1, the optical fiber 3 is attached to the fiber attach pad 6 by means of an epoxy resin 10. Preferably, the optical fiber 3 is in contact with the inclined upper surface of the attach pad 6 with no epoxy resin there between.

The fiber cable 4 comprises the optical fiber 3, an inner sleeve or coating 11 and an outer coating or jacket 12. Both of the coatings 11 and 12 are formed of plastic materials, the inner coating 11 may, for instance, be formed of a U-V cured acrylate and the outer coating 12 may be polypropylene or other plastic materials having similar properties. As shown in FIG. 4, both coatings 11 and 12 are rigidly secured to the fiber jacket tie-off 5 by means of an adhesive 13 such as an epoxy resin 10. The optical fiber 3 itself is not, however, secured directly to the fiber jacket tie-off 5 and is thus free to move to some extent in an axial direction by virtue of the resilience of the coatings 11 and 12 and/or by sliding within the inner coating 11. Such movement enables thermal expansion of the optical fiber 3 to be accommodated without inducing strain in the optical fiber.

In assembly of the apparatus, an end of the optical fiber 3 is typically first located in the V-groove 7 and the axial position of the optical fiber 3 is then adjusted to leave a gap of around 10 microns between the end of the optical fiber 3 and the end of the waveguide 8 (as shown in FIGS. 3A and 3B). If desired, stops (not shown) may be provided in the V-groove 7 to prevent the optical fiber 3 being slid into contact with the waveguide 8 (as shown in FIGS. 3A and 3B) and potentially damaging the end of the waveguide 8 (as shown in FIGS. 3A and 3B).

Furthermore, since the adhesive which adheres the fiber attach pad 6 is remote from the optical chip 1, there is greater freedom in the choice of adhesive or clamping technology used to secure the optical fiber 3 as the effect of the technology on the optical chip 1 is not of such concern.

The waveguide 8 illustrated in FIG. 3B is shown overhanging the end of the V-groove 7 (which has an inclined end-wall). This form of connection is suitable for a rib waveguide formed on a silicon-on-insulator chip but it will be appreciated that other arrangements and other types of optical chip may be used.

The fiber attach pad 6 may be formed of any suitable material and may typically be formed of ceramic to help minimize any thermal mismatch in the adhesive joint with the fiber. The fiber attach pad 6 is preferably a separate item mounted on the base 2 but in other arrangements (not shown), the fiber attach pad 6 may form part of the optical chip 1 or be mounted on the optical chip 1.

The fiber attach pad 6 should, of course, hold the optical fiber 3 in approximate alignment with the V-groove 7, but accurate alignment to within a few microns is not necessary due to the distance between the fiber attach pad 6 and the V-groove 7 (typically around 4–6 mm) and because the V-groove 7 is able to hold the optical fiber 3 in alignment with the waveguide 8 even if the optical fiber 3 is also subject to some sideways displacement, i.e. in a direction perpendicular to the optical axis and within the plane of the optical chip 1.

Other forms of locating means may be provided on the chip in place of a V-groove 7, e.g. a step or one or more pedestals against which the side of the optical fiber 3 abuts. The optical fiber 3 may also be flexed sideways, i.e. in a direction parallel to the plane of the optical chip 1, instead of or in addition to the flexing in a direction perpendicular to the plane of the optical chip 1.

Although the description given above relates to the alignment of an optical fiber with a waveguide, the fiber may also be arranged to connect with other forms of optical devices, e.g. a light emitter or a light receiver.

Figure 5:
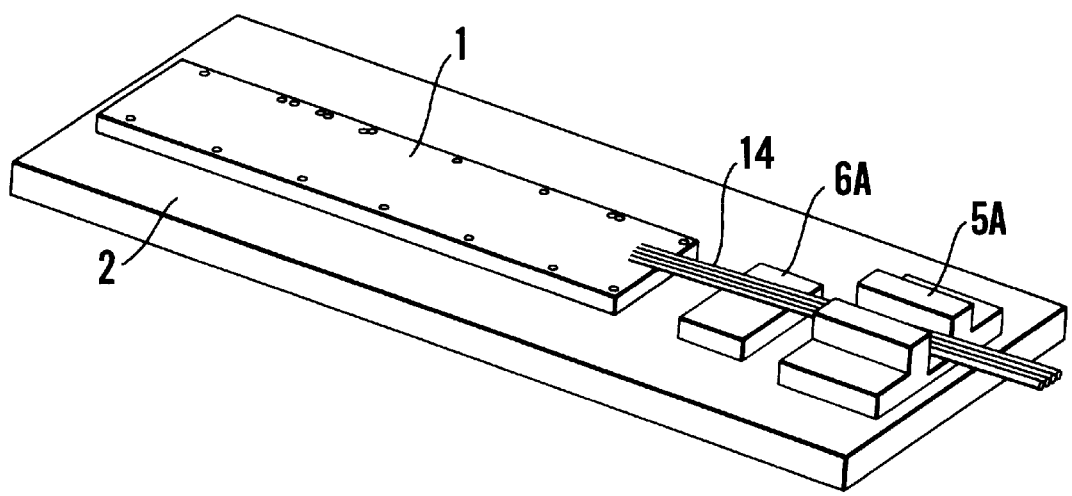
FIG. 5 is a perspective view of the apparatus according to a second embodiment of the invention.

Multiple fibers, e.g. in the form of a fiber ribbon, may be connected in a similar way. FIG. 5 shows an embodiment in which a fiber ribbon 14 comprising a plurality of optical fibers connected to an optical device. As in the embodiment described above, the fiber ribbon 14 is held by a fiber jacket tie-off 5A and the fiber ribbon 14 is secured to a fiber attach pad 6A positioned remote from an optical chip 1. Each of the optical fibers in the fiber ribbon 14 is located within a respective V-groove (not shown), or other form of locating means, on the chip 1. As shown in FIG. 5, a single fiber attach pad 6A is used to secure a plurality of optical fibers and a single fiber jacket tie-off 5A is used to hold the fiber ribbon 14.

The present invention has been described in detail for the purpose of illustration. It is understood that such detail is solely for that purpose, and variations can be made therein by those skilled in the art without departing from the scope of the invention as disclosed.

We claim:

1. An apparatus for connecting an optical fiber to an optical device comprising:

a substrate further comprising a top surface;

locating means for locating an optical fiber on the substrate; and attachment means for securing the optical fiber at a position remote from the locating means such that when the optical fiber is secured to the attachment means the optical fiber is held in a state of elastic deformation so as to assist in holding the optical fiber in contact with the locating means without the optical fiber being secured thereto.

2. The apparatus as claimed in claim 1, where the attachment means comprises mounting means inclined relative to the top surface of the substrate by an angle in the range of about 1 to 5 degrees.

3. The apparatus as claimed in claim 1, where the attachment means comprises mounting means inclined relative to the top surface of the substrate by an angle in the range of about 2.5 to 3.5 degrees.

4. The apparatus as claimed in claim 1, where the attachment means is located at a position about 2 to 10 mm from the locating means.

5. The apparatus as claimed in claim 1, where the attachment means is located at a position about 4 to 6 mm from the locating means.

6. The apparatus as claimed in claim 1, where the locating means comprises a groove formed in the top surface of the substrate.

7. The apparatus as claimed in claim 6, where the groove is a V-groove.

8. The apparatus as claimed claim 1, where the optical fiber is secured to the attachment means by an adhesive.

9. The apparatus as claimed in claim 1, where the optical fiber is secured to the attachment means by mechanical means.

10. The apparatus as claimed in claim 9, where the attachment means is formed of a ceramic.

11. The apparatus as claimed in claim 1, where the optical fiber is rigidly fixed to the attachment means at only one point.

12. The apparatus as claimed in claim 1, where the apparatus further comprises a base and the substrate is a chip, where the chip and the attachment means are mounted on the base.

13. The apparatus as claimed in claim 12, where the chip is an optical chip.

14. The apparatus as claimed in claim 12, where the chip is a silicon-on-insulator chip.

15. The apparatus as claimed in claim 1, where the elastic deformation induces a maximum strain of about 0.3–0.4% on the optical fiber.

16. The apparatus as claimed in claim 1, where the optical fiber further comprises an end which is free to move along the length of the substrate.

17. The apparatus as claimed in claim 1, where a part of the optical fiber which is to be external of the apparatus is provided with a coating and attachment means are provided for attaching the coating to the apparatus.

18. The apparatus as claimed in claim 17, where the apparatus further comprises a base and the substrate is mounted on the base and the attachment means attach the coating to the base.

19. The apparatus as claimed in claim 17, where the apparatus further comprises a base which further comprises a casing and the substrate is mounted on the base and the attachment means attach the coating to the casing which is mounted on the base.

20. The apparatus as claimed in claim 1, where the optical fiber is aligned with a waveguide provided on the substrate.

21. The apparatus as claimed in claim 1 for connecting a plurality of optical fibers to an optical device, the substrate having a plurality of locating means for receiving the respective fibers and the attachment means being arranged to secure each of the plurality of fibers at positions remote from the locating means such that when the optical fibers are secured to the attachment means each optical fiber is held in a state of elastic deformation so as to assist in holding the optical fiber in contact with the respective locating means without the optical fiber being secured thereto.

* * * * *